(12) United States Patent
Nolan

(10) Patent No.: US 9,682,620 B2
(45) Date of Patent: Jun. 20, 2017

(54) AIR-GROUND VEHICLE WITH INTEGRATED FUEL TANK FRAME

(71) Applicant: Paragrine Systems, LLC, San Diego, CA (US)

(72) Inventor: Robert Nolan, Virginia Beach, VA (US)

(73) Assignee: Paragrine Systems, LLC, San Diego, CA (US)

( * ) Notice: Subject to any disclaimer, the term of this patent is extended or adjusted under 35 U.S.C. 154(b) by 0 days.

(21) Appl. No.: 14/480,082

(22) Filed: Sep. 8, 2014

(65) Prior Publication Data

US 2015/0210161 A1    Jul. 30, 2015

Related U.S. Application Data

(60) Provisional application No. 61/874,449, filed on Sep. 6, 2013.

(51) Int. Cl.

| B60K 15/07 | (2006.01) |
|---|---|
| B60K 15/063 | (2006.01) |
| B60K 15/073 | (2006.01) |
| B64D 37/04 | (2006.01) |
| B60K 15/03 | (2006.01) |

(52) U.S. Cl.
CPC .......... *B60K 15/063* (2013.01); *B60K 15/073* (2013.01); *B64D 37/04* (2013.01); *B60K 2015/03144* (2013.01); *B60K 2015/03256* (2013.01); *B60K 2015/0636* (2013.01); *B60Y 2200/50* (2013.01)

(58) Field of Classification Search
CPC ............... B60K 15/063; B60K 15/073; B60K 2015/03144; B60K 2015/03256; B60K 2015/0636; B64D 37/04; B60Y 2200/50
USPC ............. 280/834; 244/135 R, 135 A, 135 B, 244/137.1, 149
See application file for complete search history.

(56) References Cited

U.S. PATENT DOCUMENTS

| 2,619,301 A | 11/1952 | Hall |
| 2,623,712 A | 12/1952 | Spratt |
| 2,843,145 A | 7/1958 | Koehler et al. |
| 3,135,483 A | 6/1964 | Girard |
| 3,361,388 A | 1/1968 | Girard et al. |
| 3,383,078 A * | 5/1968 | Shohet .................. B64D 37/04 244/135 R |
| 3,778,011 A * | 12/1973 | Cannon .................. B64C 27/00 224/401 |

(Continued)

*Primary Examiner* — Jacob Knutson
(74) *Attorney, Agent, or Firm* — Tanner IP, PLLC

(57) ABSTRACT

Air-ground vehicle fuel tank configurations and associated features are described that can be incorporated in the structural design of a vehicle in ways that improve both the ground mobility and flight capability of the vehicle. A vehicle frame may include a fuel tank with a main tank and two or more auxiliary tanks. The main tank may be disposed along the centerline of the vehicle, and the auxiliary tanks may extend upward and outward from the main tank, for example forming a "V" shape when viewed from the front. The auxiliary tanks may be substantially arc-shaped, when viewed from the side of the vehicle, and may be attached to the main tank at each end of the arc-shape. Each of the auxiliary tanks may include an attachment mechanism configured to attach to an airfoil suspension at or near an apex of the auxiliary tanks.

19 Claims, 22 Drawing Sheets

(56) References Cited

U.S. PATENT DOCUMENTS

| | | | |
|---|---|---|---|
| 4,432,515 A * | 2/1984 | Jarvineva | B64D 37/06 244/123.5 |
| 4,601,443 A | 7/1986 | Jones et al. | |
| 4,657,207 A | 4/1987 | Poling | |
| 4,715,417 A * | 12/1987 | Coloney | B64D 37/04 220/562 |
| 4,810,028 A * | 3/1989 | Henricks | B62D 21/08 293/42 |
| 4,860,972 A * | 8/1989 | Lannerd | B64D 37/04 244/135 R |
| 4,875,642 A | 10/1989 | Flynn | |
| 4,930,724 A | 6/1990 | Snyder | |
| 4,934,630 A | 6/1990 | Snyder | |
| 5,160,100 A | 11/1992 | Snyder | |
| 5,190,441 A | 3/1993 | Murphy et al. | |
| 5,836,541 A * | 11/1998 | Pham | B64C 37/00 244/2 |
| 6,360,991 B1 | 3/2002 | Alan | |
| 6,676,084 B2 | 1/2004 | Asseline et al. | |
| 6,776,374 B2 | 8/2004 | LaSee | |
| 6,877,690 B1 | 4/2005 | Bragg | |
| 7,066,426 B2 | 6/2006 | Preston | |
| D583,293 S | 12/2008 | Frost | |
| 7,857,260 B2 * | 12/2010 | Morgia | B64D 37/26 244/135 C |
| 7,874,512 B2 | 1/2011 | Xu | |
| 8,528,852 B2 | 9/2013 | Farrag | |
| 2002/0193914 A1 | 12/2002 | Talbert et al. | |
| 2005/0230521 A1 | 10/2005 | Medsker et al. | |
| 2005/0247819 A1 * | 11/2005 | Caruso | B60F 5/02 244/2 |
| 2007/0023566 A1 | 2/2007 | Howard | |
| 2012/0111417 A1 * | 5/2012 | Smith | B64D 37/04 137/14 |
| 2013/0211173 A1 * | 8/2013 | Eckholm, II | F42B 39/16 588/259 |

* cited by examiner

AIR-GROUND VEHICLE WITH INTEGRATED FUEL TANK FRAME

RELATED APPLICATIONS

This application claims priority to U.S. Provisional Application Ser. No. 61/874,449, filed Sep. 6, 2013, the contents of which are hereby incorporated by reference in their entirety.

BACKGROUND OF THE INVENTION

The present invention generally relates to a novel fuel tank configuration that can be advantageously used in a vehicle, e.g. a vehicle having ground and/or flight capability.

There is an ongoing need for vehicles having powered ground and flight mobility. Such designs are of interest, for example, in military, border enforcement, and many other governmental and civilian activities. Historically, efforts to incorporate robust ground mobility and sustainable flight have met with extremely limited success based on various factors including, for example, the often contrary design parameters of ground and aerial vehicles.

The present subject matter overcomes at least some aspects of the historical challenges in this area by providing a novel fuel tank configuration, and associated features, that can be advantageously incorporated in the structural design of a vehicle in ways that improve both the ground mobility and flight capability of the vehicle.

BRIEF SUMMARY OF THE INVENTION

According to first aspects of the invention, a vehicle frame may include a fuel tank with a main tank and at least two auxiliary tanks. In embodiments, the main tank may be disposed substantially along the centerline of the vehicle, and the at least two auxiliary tanks may extend upward and outward from the main tank.

In embodiments, the main tank and the at least two auxiliary tanks may be substantially tube-shaped.

In embodiments, each of the at least two auxiliary tanks may be substantially arc-shaped, and may be attached to the main tank at each end of the arc-shape.

In embodiments, each of the at least two auxiliary tanks may include a check valve at, or about, each end, each check valve configured to allow fuel to flow from the auxiliary tanks to the main tank and impede fuel from flowing from the main tank to the auxiliary tanks.

In embodiments, each of the at least two auxiliary tanks may include a check valve that allows fuel to flow from the auxiliary tanks to the main tank and impedes fuel from flowing from the main tank to the auxiliary tanks.

In embodiments, the main tank and the at least two auxiliary tanks may form the primary longitudinal support frames for the vehicle.

In embodiments, the frame may be integrated into a ground vehicle with flight capability.

In embodiments, each of the auxiliary tanks may include an attachment mechanism configured to attach to an airfoil suspension, preferably at or near an apex of the auxiliary tanks.

Embodiments may include one or more elongated structural members that connect the auxiliary tanks to the main tank, wherein each of the auxiliary tanks may be connected to one of the structural members at, or about, the attachment mechanism such that a lift force from the airfoil suspension is distributed to the main tank during flight.

In embodiments, the elongated structural members may be connected to the main tank forward of the attachment mechanisms.

In embodiments, the main tank may be connected to and/or with a front wheel suspension and/or a rear wheel suspension.

In embodiments, at least the main tank may be configured as a load-bearing frame for the front and rear wheel suspensions, and at least the auxiliary tanks may be configured as a load-bearing frame for an airfoil suspension.

In embodiments, the front and/or rear wheel suspensions may include a shock absorbing mechanism attached to the auxiliary tanks.

In embodiments, the shock absorbing mechanism may be configured to transition between an active configuration and an inactive or transport configuration, whereby the overall height of the vehicle can be reduced by about 12-20 inches, or about 16 inches.

In embodiments, the at least two auxiliary tanks may extend upward and outward from the main tank at an angle between 20° and 80° to horizontal, between 30° and 80° to horizontal, or between 60° and 80° to horizontal.

In embodiments, the at least two auxiliary tanks may form a "V" shape and may be joined to the main tank at the base of the "V" when viewed from the front of the vehicle fame.

Embodiments may include a cockpit disposed over the main tank and between the at least two auxiliary tanks.

Embodiments may include an overhead control panel disposed at least partially above the cockpit and between the at least two auxiliary tanks, wherein the overhead control panel may include one or more of electrical hard point controls, circuit breakers, engine monitors, atmospheric indicators, performance indicators, and one or more structural supports connecting the at least two auxiliary tanks.

In embodiments, the overhead control panel may be disposed approximately 50-70 degrees over the approximate location of the pilot's head.

Embodiments may include a cargo area disposed over the main tank, between the at least two auxiliary tanks, and aft of the cockpit.

In embodiments, the cargo area may include a removable rear seat.

In embodiments, the main tank may include a depression at the rear, and a fuel outlet in the depression.

In embodiments, the frame may be incorporated in a vehicle that is configured to be suspended by a connection mechanism (e.g. a parachute attachment point) attached to the auxiliary tanks.

Embodiments may include an avionics suite mounted to and over the main tank.

In embodiments, the frame may be integrated in a vehicle and the main tank and the auxiliary tanks may extend along at least 75%, 80%, 85% or 90% of length of the vehicle.

Embodiments may include a ring-shaped propeller shroud attached to the main tank and the auxiliary tanks.

In embodiments, the propeller shroud may be collapsible, e.g. to about 50% of its overall diameter.

Embodiments may include a windshield attached to the auxiliary tanks.

According to further aspects of the invention, a fuel tank may be provided including a main tank; and at least two auxiliary tanks, wherein, the at least two auxiliary tanks extend upward and outward from the main tank, and the at least two auxiliary tanks may be substantially arc-shaped, and may be attached to the main tank at each end of the arc-shape.

In embodiments, the at least two auxiliary tanks form a "V" shape and may be joined to the main tank at the base of the "V" when viewed from the front of the fuel tank.

In embodiments, the main tank may include a depression at the rear of the fuel tank, and a fuel outlet in the depression.

In embodiments, each of the at least two auxiliary tanks may include a check valve at, or about, each end, each check valve configured to allow fuel to flow from the auxiliary tanks to the main tank and impede fuel from flowing from the main tank to the auxiliary tanks.

In embodiments, each of the at least two auxiliary tanks may include a check valve that allows fuel to flow from the auxiliary tanks to the main tank and impedes fuel from flowing from the main tank to the auxiliary tanks.

In embodiments, the fuel tank may be integrated into a ground vehicle.

In embodiments, the main tank may be connected to and/or with a front wheel suspension and/or a rear wheel suspension.

In embodiments, the ground vehicle may have flight capability, at least the main tank may be configured as a load-bearing frame for the front and rear wheel suspensions, and at least the auxiliary tanks may be configured as a load-bearing frame for an airfoil suspension.

In embodiments, the auxiliary tanks may include an attachment point for the front and/or rear wheel suspensions.

In embodiments, the at least two auxiliary tanks may extend upward and outward from the main tank at an angle between 20° and 80° to horizontal, between 30° and 80° to horizontal, or between 60° and 80° to horizontal.

In embodiments, the fuel tank may be incorporated in a vehicle that is configured to be suspended by a connection mechanism (e.g. a parachute attachment point) attached to the auxiliary tank s.

In embodiments, the fuel tank may include open cell foam.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention claimed. The detailed description and the specific examples, however, indicate only preferred embodiments of the invention. Various changes and modifications within the spirit and scope of the invention will become apparent to those skilled in the art from this detailed description.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the related technology. No attempt is made to show structural details of technology in more detail than may be necessary for a fundamental understanding of the invention and various ways in which it may be practiced. In the drawings.

DETAILED DESCRIPTION OF THE INVENTION

Figure 1:
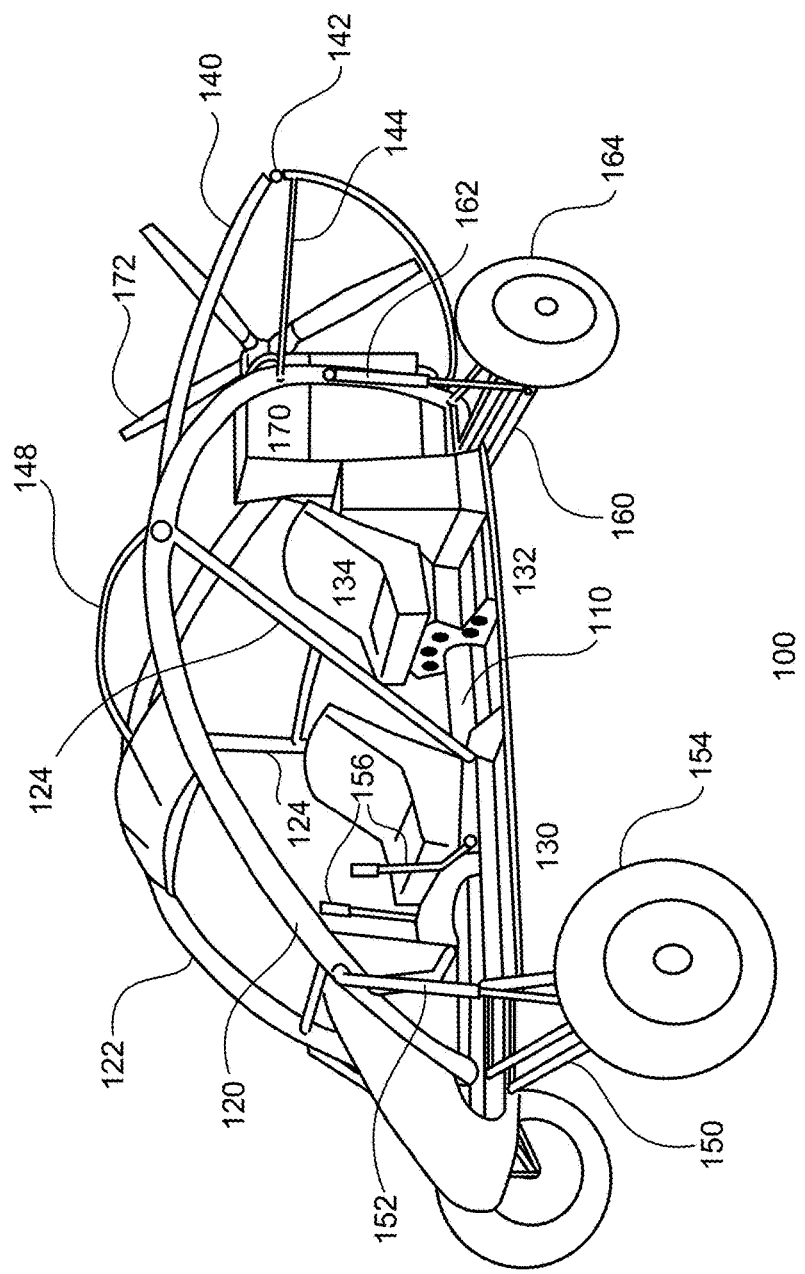
FIG. 1 depicts a left side view of an exemplary vehicle that may be configured for powered ground mobility and/or flight capability according to aspects of the invention.

It is understood that the invention is not limited to the particular methodology, protocols, etc., described herein, as these may vary as the skilled artisan will recognize. It is also to be understood that the terminology used herein is used for the purpose of describing particular embodiments only, and is not intended to limit the scope of the invention. It also is to be noted that as used herein and in the appended claims, the singular forms "a," "an," and "the" include the plural reference unless the context clearly dictates otherwise. Thus, for example, a reference to "a tank" is a reference to one or more tanks and equivalents thereof known to those skilled in the art.

Unless defined otherwise, all technical terms used herein have the same meanings as commonly understood by one of ordinary skill in the art to which the invention pertains. The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law.

FIG. 1 shows a partially assembled vehicle 100 including an integral frame/fuel tank 110 with a main tank and two auxiliary tanks 120, 122. A pilot cockpit 130 and cargo/passenger area 132 are also shown, disposed over the main tank 110 and between the two auxiliary tanks 120, 122. In embodiments, the cargo area 132 may include a removable rear seat 134.

The auxiliary tanks 120, 122 are substantially arc-shaped and extend along in excess of 80% of the length of the vehicle 100 and up to 80% or more of the height of the vehicle 100. In embodiments, the frame may be integrated in a vehicle and the main tank and the auxiliary tanks may extend along at least 75%, 80%, 85% or 90% of length of the vehicle.

FIG. 1 also shows a ring-shaped propeller shroud 140 attached to the main tank 110 and the auxiliary tanks 120, 122, in which the propeller shroud 140 is collapsed to about 60% of its overall diameter. In embodiments, the propeller shroud 140 may be collapsed to about 50% of its overall diameter, e.g. by folding to the rear. In embodiments, the propeller shroud 140 may have a diameter in a range of approximately 70 inches to 80 inches, or approximately 74 inches.

FIG. 1 also shows an example of how the main tank 110 and auxiliary tanks 120, 122 may be connected to and/or with a front wheel suspension 150 and a rear wheel suspension 160.

In the embodiment shown in FIG. 1, the main tank 110 is configured as a load-bearing frame for the front and rear wheel suspensions 150, 160, and the auxiliary tanks 120, 122 are configured as a load-bearing frame for an airfoil suspension, described further below.

In the embodiment shown in FIG. 1, the front and rear wheel suspensions 150, 160 include a shock absorbing mechanism 152, 162 attached to the auxiliary tanks 120, 122.

In the embodiment shown in FIG. 1, the shock absorbing mechanism 152, 162 is configured to transition between an active configuration and an inactive or transport configuration, whereby the overall height of the vehicle 100 can be reduced by about 16 inches. However, other embodiments may include configurations whereby the overall height of the vehicle may be adjusted, for example, by about 12-20 inches.

Figure 2:
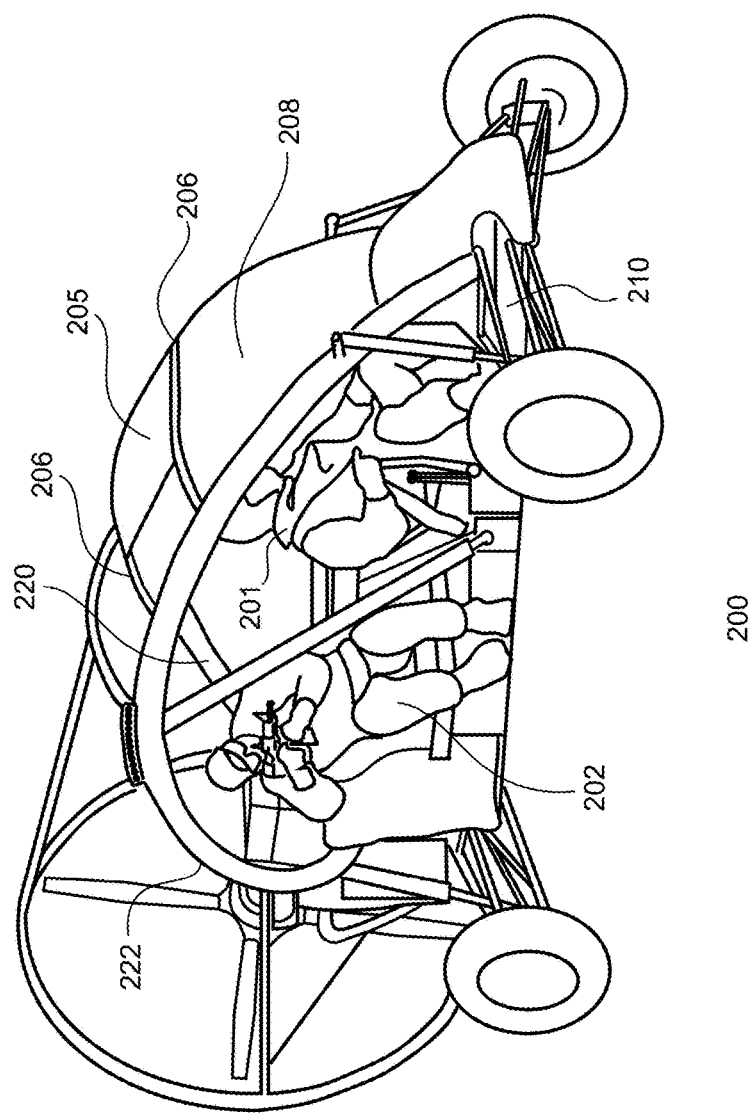
FIG. 2 depicts a right side view of an exemplary vehicle that may be configured for powered ground mobility and/or flight capability according to aspects of the invention.

FIG. 2 shows a more fully assembled vehicle 200 based on the assembly of FIG. 1, that is configured for powered ground mobility using only the propeller at the rear of the vehicle. A pilot/driver 201 is shown in the cockpit and passengers 202 are shown in the cargo/passenger area.

In the embodiment shown in FIG. 2, the main tank and the two auxiliary tanks 220, 222 form the primary longitudinal support frames for the vehicle 200. Additionally, an overhead control panel 205 is shown disposed at least partially above the cockpit and between the at least two auxiliary tanks 220, 222. The overhead control panel 205 may include, for example, one or more of electrical hard point controls, circuit breakers, engine monitors, atmospheric indicators, performance indicators, etc. The overhead control panel 205 may also include one or more structural supports 206 connecting the at least two auxiliary tanks 220, 222, as discussed further below.

In embodiments, the overhead control panel 205 may be disposed approximately 50-70 degrees over the approximate location of the pilot's head.

FIG. 2 also shows a windshield 208 attached to, and substantially between, the auxiliary tanks 220, 222, in front of the driver/pilot 201.

Figure 3:
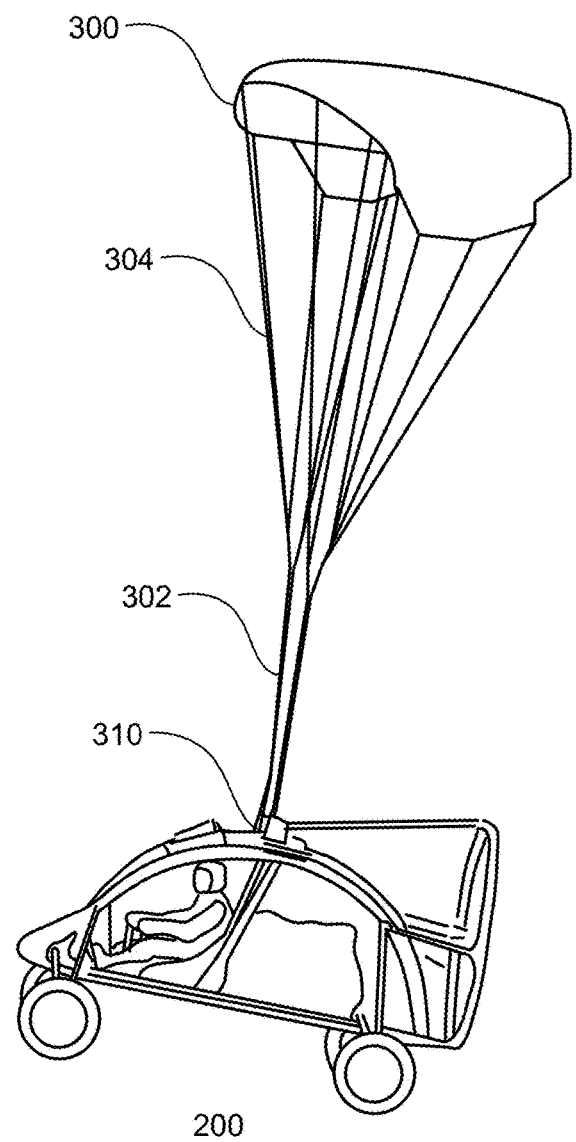
FIG. 3 depicts a left side view of an exemplary vehicle according to aspects of the invention in flight.

FIG. 3 shows an in-flight picture of the vehicle 200 shown in FIG. 2, including attached airfoil 300. This provides an example of the frame shown in FIG. 1 being integrated into a ground vehicle with flight capability. As can be seen in FIG. 3, the airfoil 300 is attached to the vehicle 200 via an attachment mechanism (e.g. a parachute attachment point 310), at or near the apex of the auxiliary tanks. As used herein, the apex of the auxiliary tanks may be understood as the location along the auxiliary tanks corresponding to a maximum height with respect to the height of the vehicle.

Considering the views shown in FIGS. 2 and 3, it may be understood how exemplary embodiments may include the features whereby the ground vehicle has flight capability, at least the main tank is configured as a load-bearing frame for the front and rear wheel suspensions, and at least the auxiliary tanks are configured as a load-bearing frame for the airfoil suspension.

Figure 4:
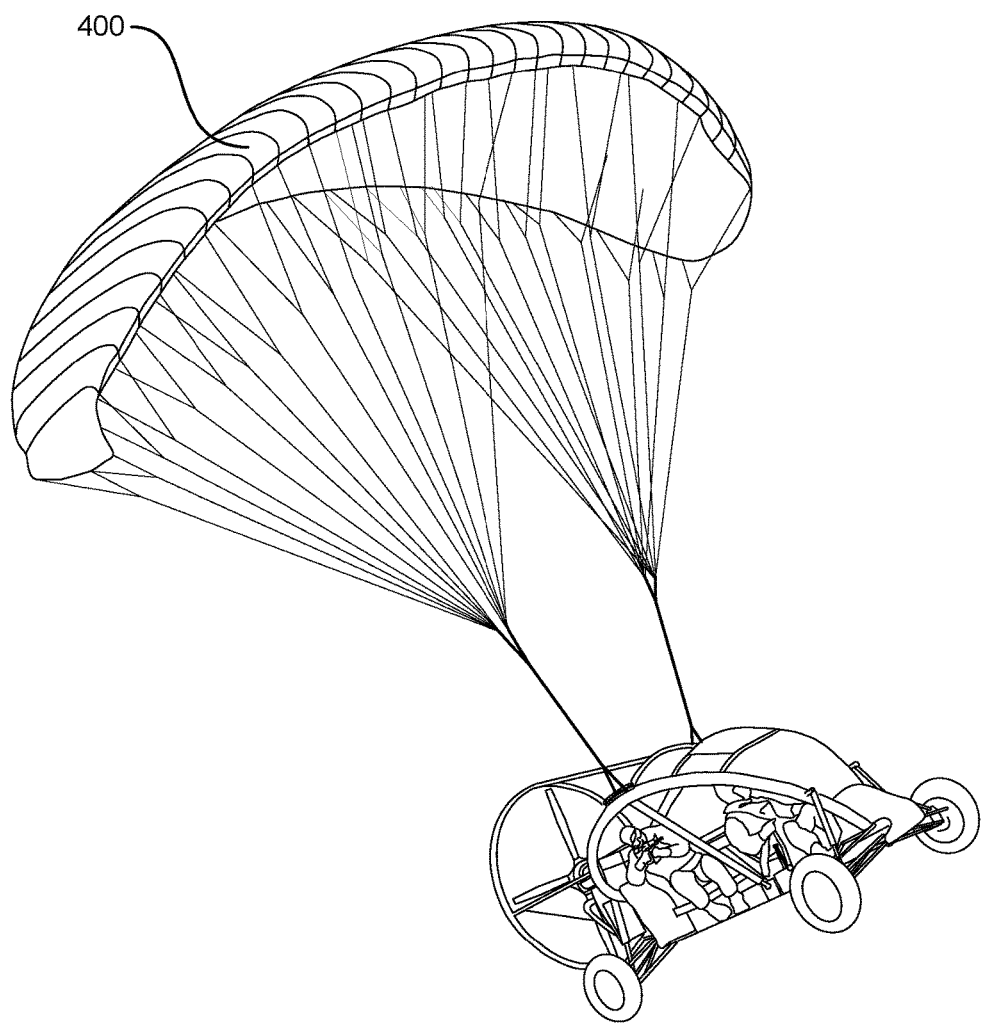
FIG. 4 depicts a right side view of an exemplary vehicle according to aspects of the invention in flight.

FIG. 4 shows another in-flight picture of the vehicle 200 shown in FIG. 3, including an elliptical ram-air airfoil 400.

Figure 5:
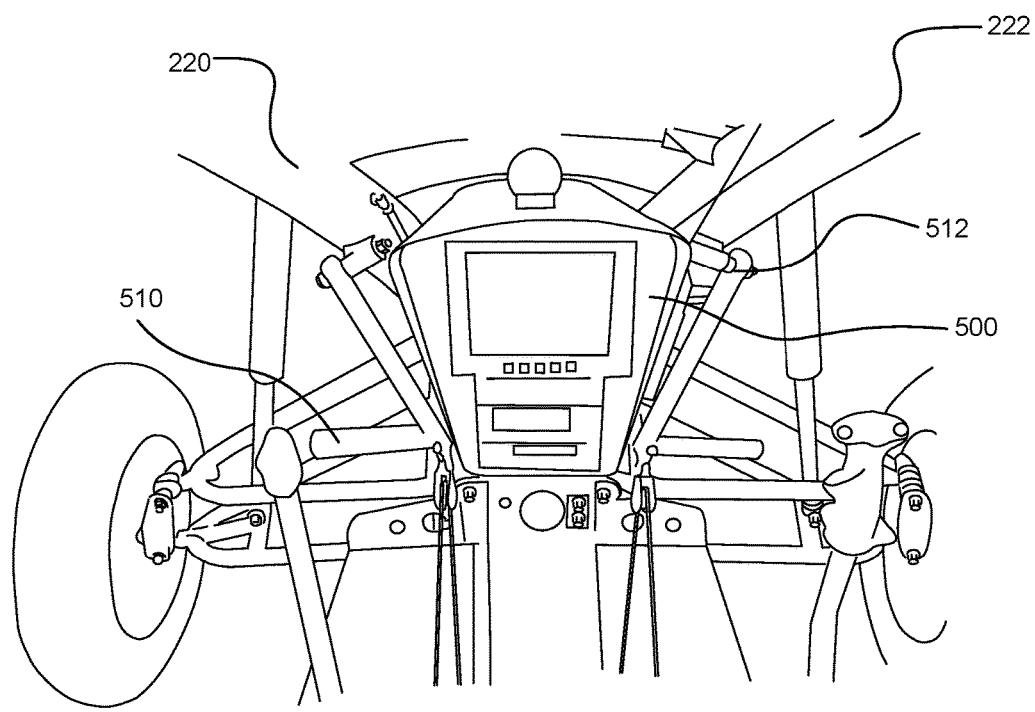
FIG. 5 depicts details of a control console, air steering mechanism and front suspension of an exemplary vehicle according to aspects of the invention.
Figure 6:
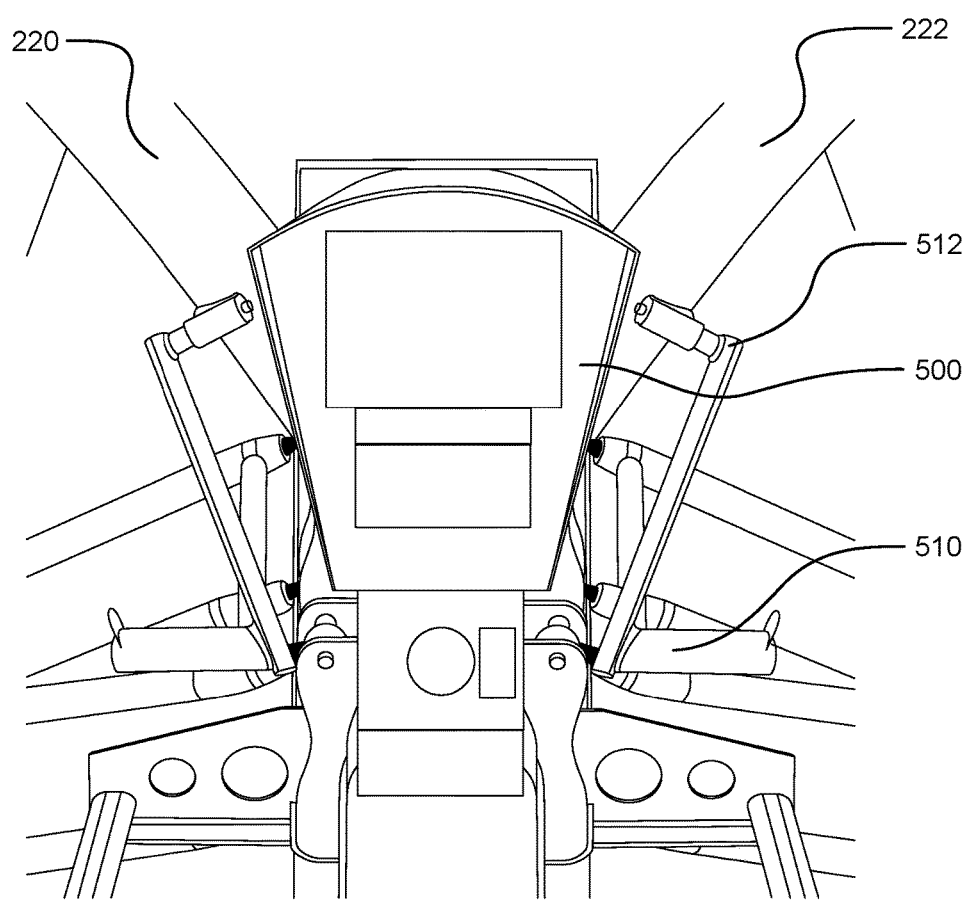
FIG. 6 depicts a details of a control console, air steering mechanism and front suspension of an exemplary vehicle according to aspects of the invention.

FIGS. 5 and 6 show further details of an avionics suite 500 mounted to and over the main tank, as well as air steering pedals 510 mounted to the auxiliary tanks 220, 222. In embodiments, the air steering pedals 510 may be mounted to the auxiliary tanks and may angle inward toward a centerline of the vehicle from their attachment points 512.

Figure 7:
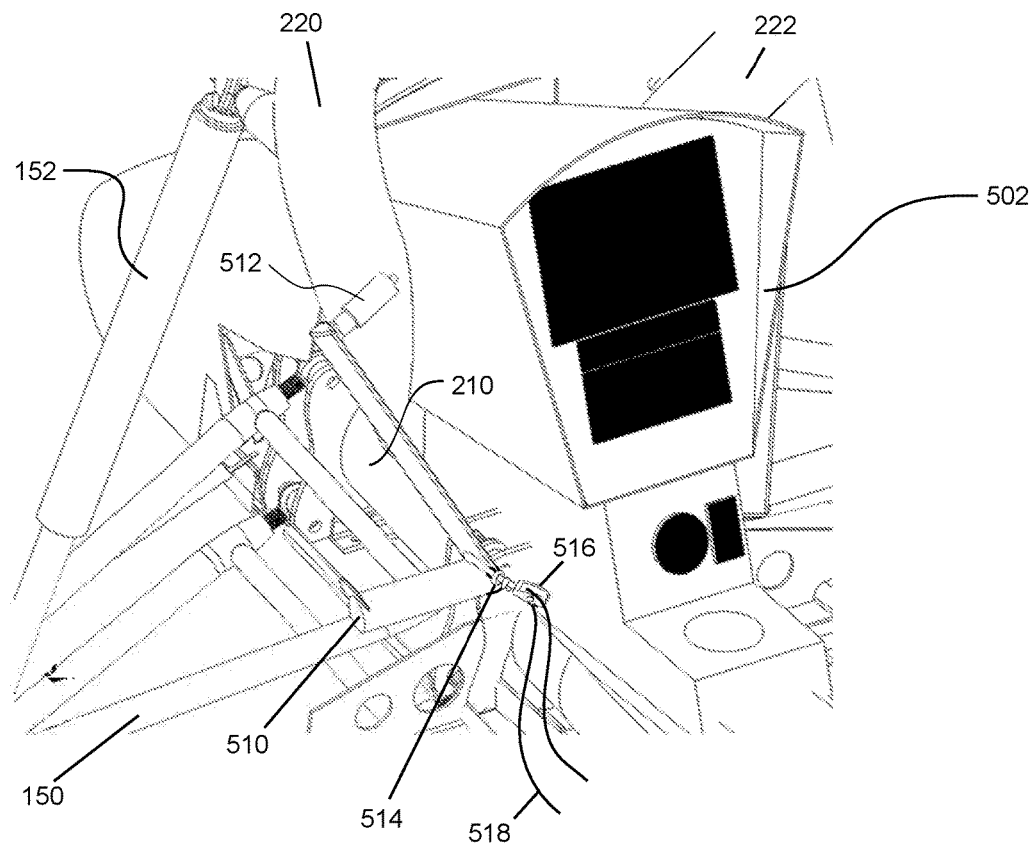
FIG. 7 depicts a left side view including details of a control console, air steering mechanism and front suspension of an exemplary vehicle according to aspects of the invention.

FIG. 7 shows further details of the shell 502 for the avionics suite 500 mounted to and over the main tank 210, and the air steering pedals 510 mounted to the auxiliary tanks 220. In embodiments, the air steering pedals 510 may include pulleys 516 through which air steering lines 518 for the airfoil are run. FIG. 7 also shows how parts of the front suspension 150 and shock absorbers 152 can be affixed to the main tank 210 and auxiliary tanks 220, 222, respectively.

Figure 8:
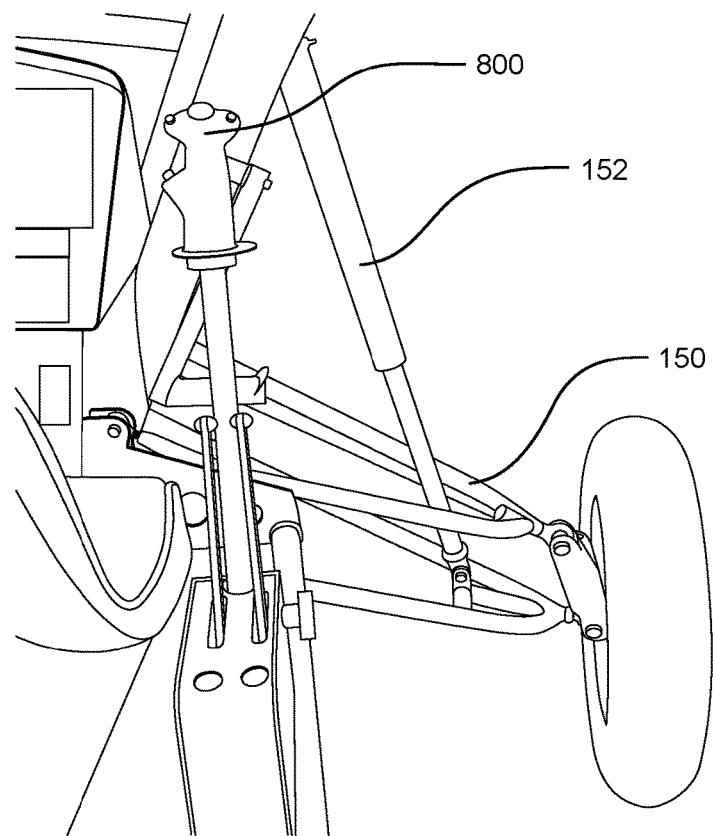
FIG. 8 depicts additional details of an air steering mechanism and front suspension of an exemplary vehicle according to aspects of the invention.

FIG. 8 shows further details of the front suspension 150 and shock absorbers 152 showing the significant range of motion of the shock absorbers 152 in the active configuration. To the left of FIG. 8, the pilot/driver's hand can be seen on a ground steering mechanism 800 that may be configured to steer the wheels of the vehicle.

Figure 9:
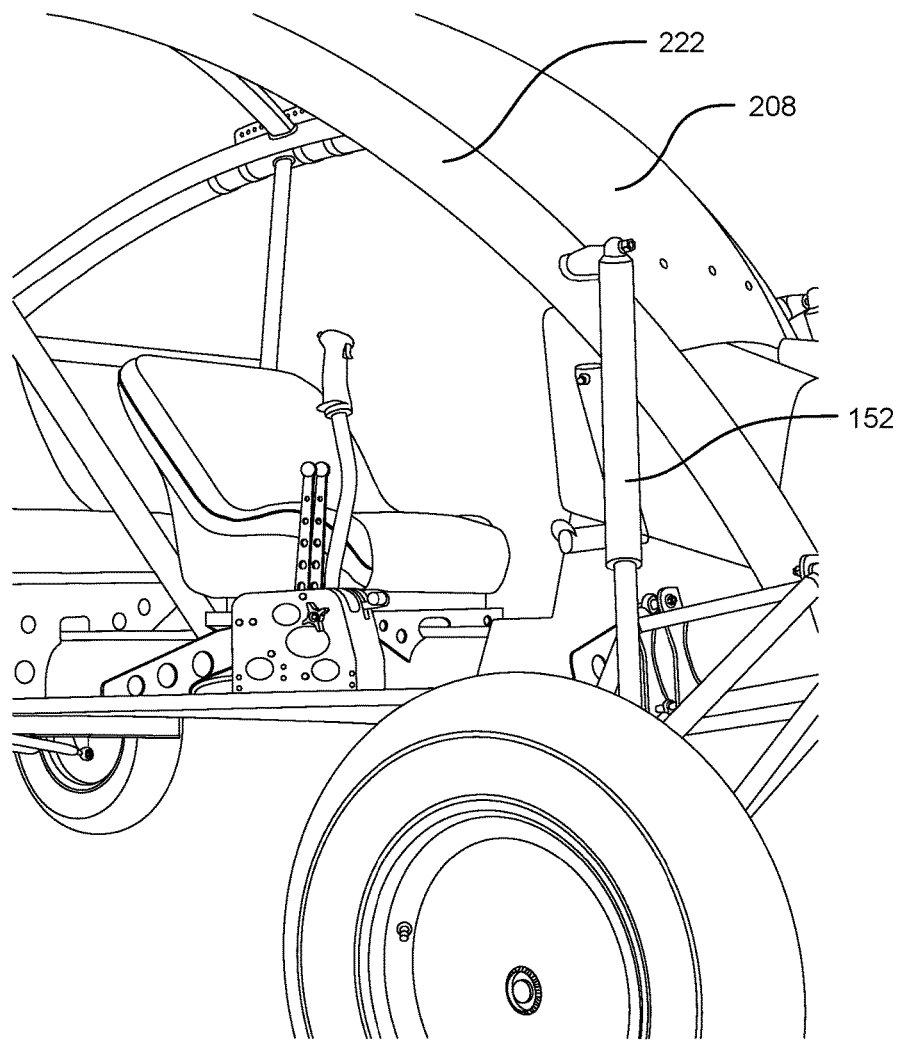
FIG. 9 depicts a right side view including details of a cockpit, frame, front windshield, and front suspension of an exemplary vehicle according to aspects of the invention.

FIG. 9 shows further details of the cockpit and the shock absorbers 152 and windshield 208 attached to the auxiliary tanks.

Figure 10:
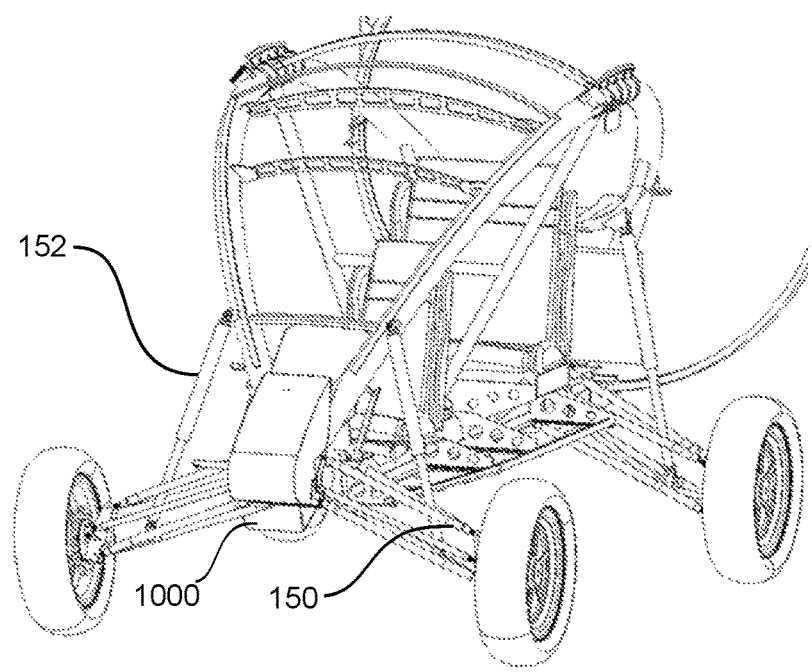
FIG. 10 depicts details of a frame and front suspension of an exemplary vehicle according to aspects of the invention.

FIG. 10 shows further details of the front suspension 150 (including a rack and pinion steering system 1000) and shock absorbers 152 affixed to the main tank and auxiliary tanks, respectively.

Figure 11:
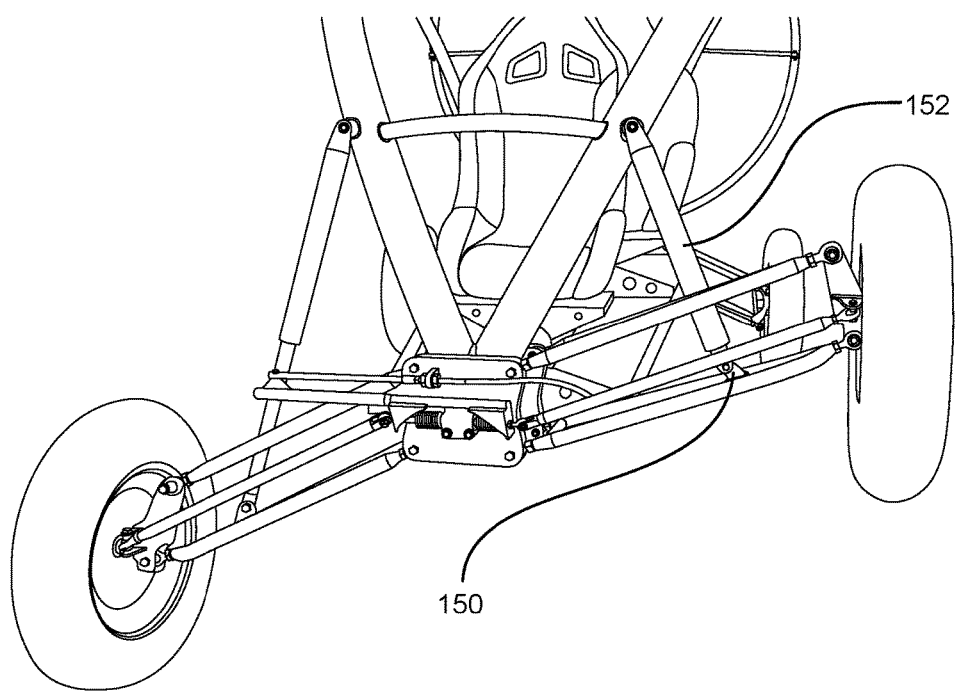
FIG. 11 depicts details of a frame and front suspension showing a range of motion for the front suspension of an exemplary vehicle according to aspects of the invention.

FIG. 11 shows further details of the front suspension 150 and shock absorbers 152, showing, in particular, the significant range of motion of the shock absorbers 152, e.g. over 12 inches, or over 16 inches.

Figure 12:
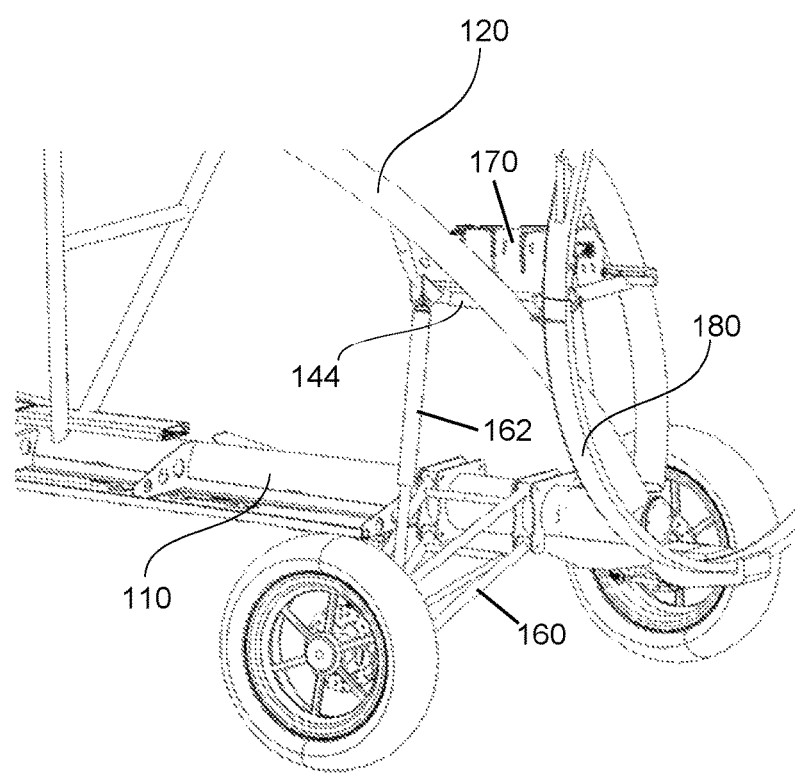
FIG. 12 depicts details of a frame, engine and rear suspension of an exemplary vehicle according to aspects of the invention.

FIG. 12 shows further details of the rear suspension 160 and shock absorbers 162 showing the rear suspension and shock absorbers affixed to the main tank 110 and auxiliary tanks 120, respectively. FIG. 12 further shows an engine 170 mounted above the main tank and between the auxiliary tanks, and a propeller hoop ring 180 (to the extreme right) mounted to the main tank and attached to the auxiliary tanks via support members 144.

Figure 13:
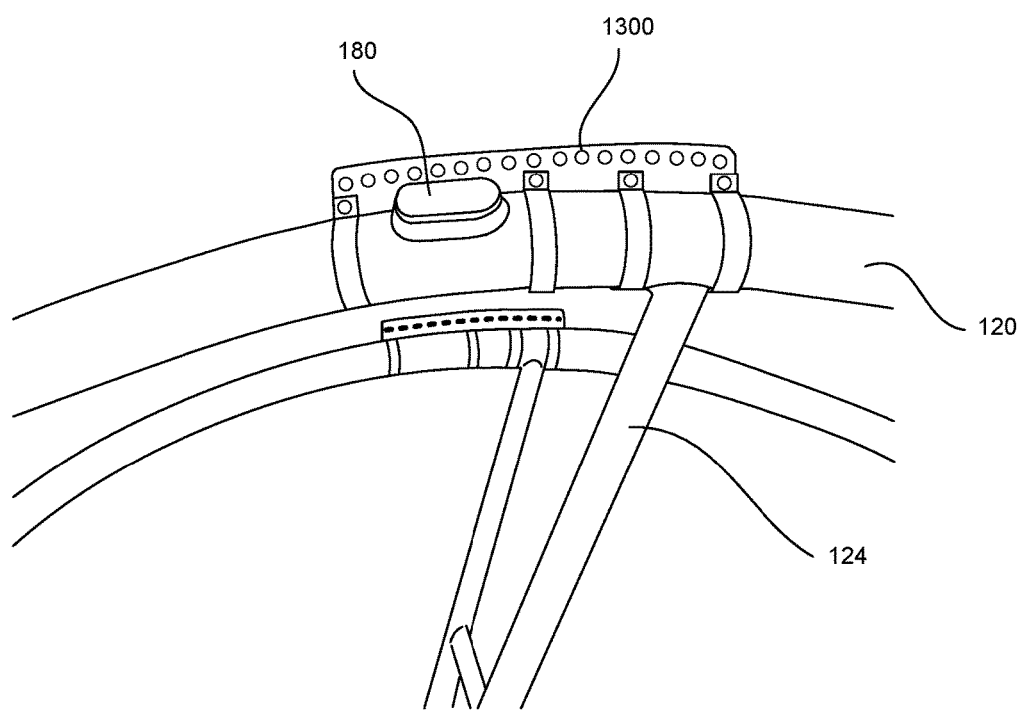
FIG. 13 depicts details of a frame, airfoil attachment, and auxiliary supports of an exemplary vehicle according to aspects of the invention.

FIG. 13 shows further details of an attachment mechanism, e.g. a parachute attachment point 1300, where the airfoil support may be attached to the auxiliary tanks 120, 122. As can be seen in FIGS. 1, 3, 13 and 14, embodiments may also include one or more elongated structural members 124 that connect the auxiliary tanks 120, 122 to the main tank 110, wherein each of the auxiliary tanks may be connected to one of the structural members 124 at, or about, the attachment mechanism such that a lift force from the airfoil suspension is distributed to the main tank during flight.

Figure 14:
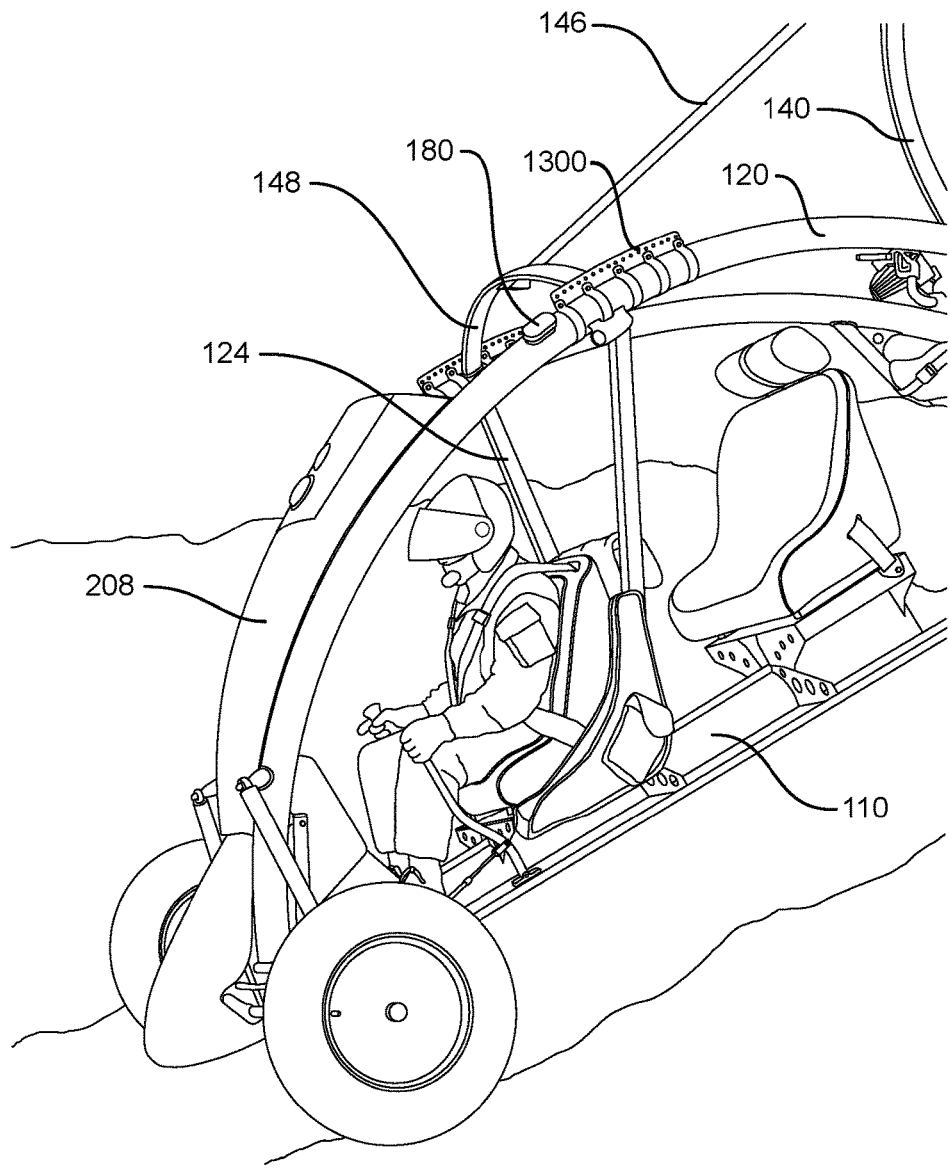
FIG. 14 depicts a left side view including details of a windshield, front wheels, cockpit, ground steering mechanism, and rear seating area, of an exemplary vehicle according to aspects of the invention.
Figure 15:
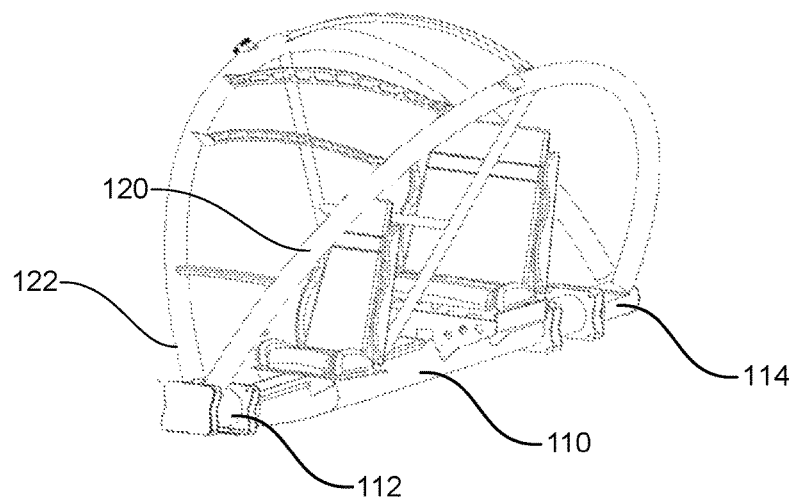
FIG. 15 depicts a front-left side view including details of a frame, cockpit, and rear seating area, of an exemplary vehicle according to aspects of the invention.
Figure 18:
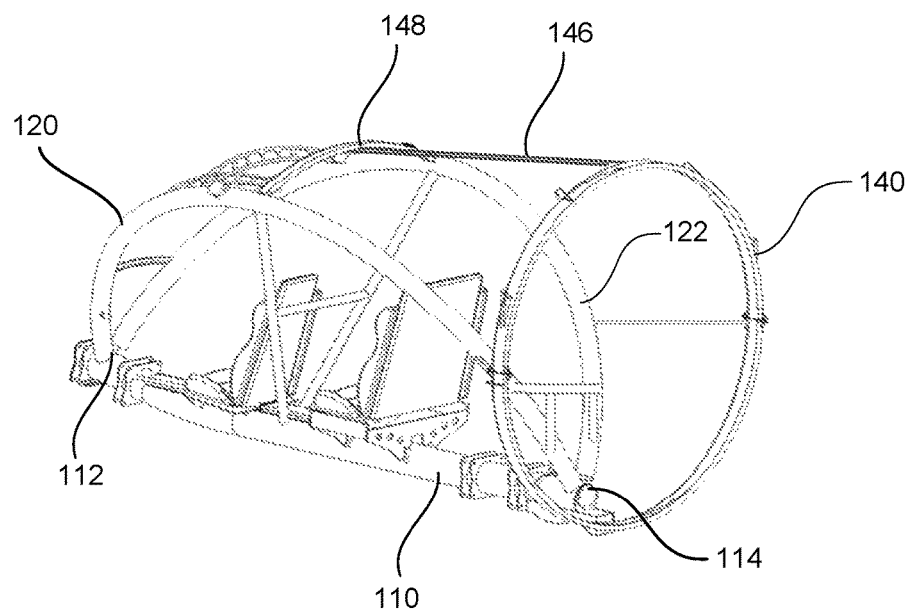
FIG. 18 depicts a rear-left view including details of a frame, engine mount, and propeller shroud of an exemplary vehicle according to aspects of the invention.

FIG. 14 also shows additional details regarding a windshield 208 mounted between the auxiliary tanks, an auxiliary support 146 connecting the propeller shroud 140 to a crossbrace 148 between the auxiliary tanks, and the elongated structural members 124 being connected to the main tank 110 forward of the attachment mechanisms. (See also FIG. 18).

FIGS. 15-19 all show various aspects of the main tank disposed substantially along the centerline of the vehicle, and two auxiliary tanks 120, 122 extending upward and outward from the main tank 110. As can be seen, the main tank 110 and the at least two auxiliary tanks 120, 122 may be substantially tube-shaped, each of the two auxiliary tanks 120, 122 may be substantially arc-shaped, and/or each of the two auxiliary tanks 120, 122 may be attached to the main tank 110 at or about each end 112, 114 of the arc-shape.

In embodiments, the main fuel tank may hold approximately 10-30 gallons, or about 17 gallons, and/or each of the auxiliary tanks may hold approximately 5-15 gallons, or about 6 gallons. In embodiments, the main fuel tank may have a diameter of approximately 4-8 inches, or about 6 inches, and/or each of the auxiliary tanks may have a diameter of approximately 3-6 inches, or about 5 inches. The auxiliary tanks may each be configured with a fill port 180 at an approximate apex of the arc-shape.

Figure 16:
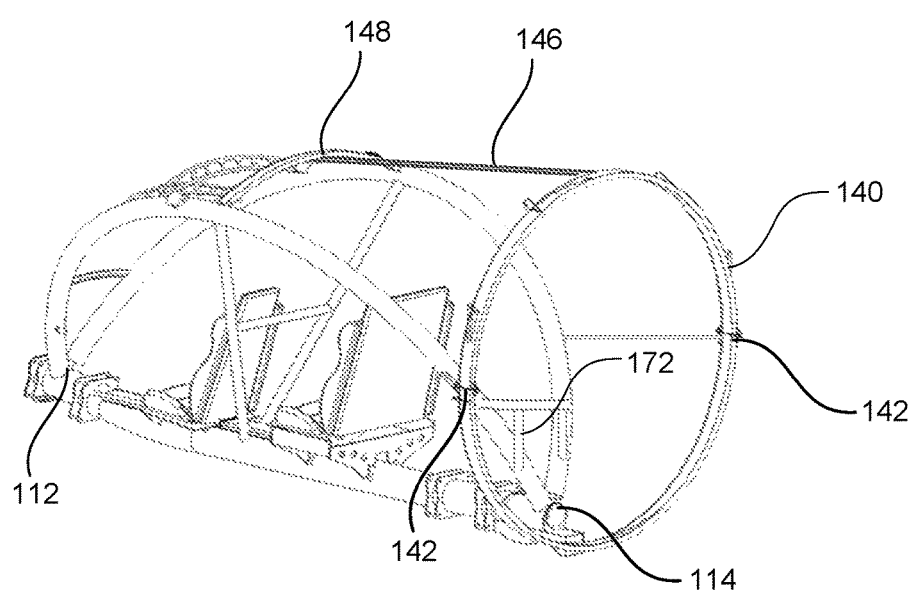
FIG. 16 depicts a rear-left view including details of a frame, engine mount, and propeller shroud of an exemplary vehicle according to aspects of the invention.

As shown in FIG. 16, the auxiliary tanks may also include a mount 172 for the engine attached thereto, and the propeller hoop ring 140 may include a pair of hinges 142 at about the middle of the hoop to allow folding of the hoop ring. The propeller hoop ring may be fixedly attached at the base to the main tank (or an extension 1930 of the main tank), and may further include supports 144 that attach to the auxiliary tanks or cross pieces that connect the auxiliary tanks to one another (see FIG. 19 also).

Figure 17:
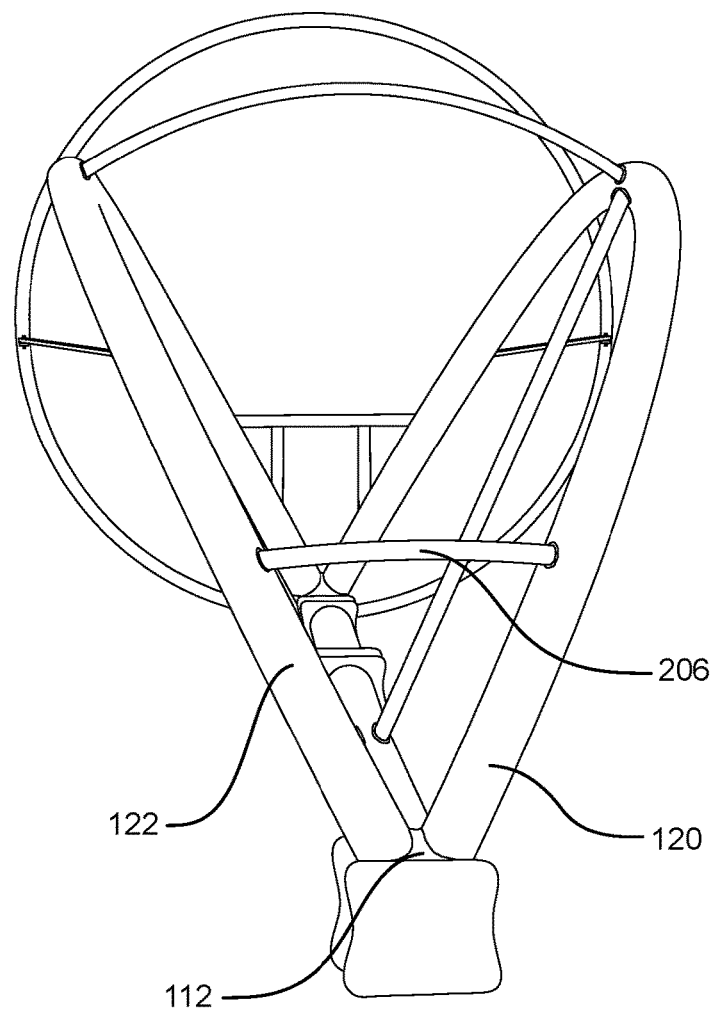
FIG. 17 depicts a depicts a front view including details of a frame and propeller shroud of an exemplary vehicle according to aspects of the invention.

As shown in FIG. 17, the two auxiliary tanks 120, 122 may form a "V" shape and may be joined to the main tank at the base of the "V" when viewed from the front (or rear) of the vehicle fame.

In embodiments, the two or more auxiliary tanks 120, 122 (may extend upward and outward from the main tank at an angle between 20° and 80° to horizontal, between 30° and 80° to horizontal, or between 60° and 80° to horizontal.

Figure 19:
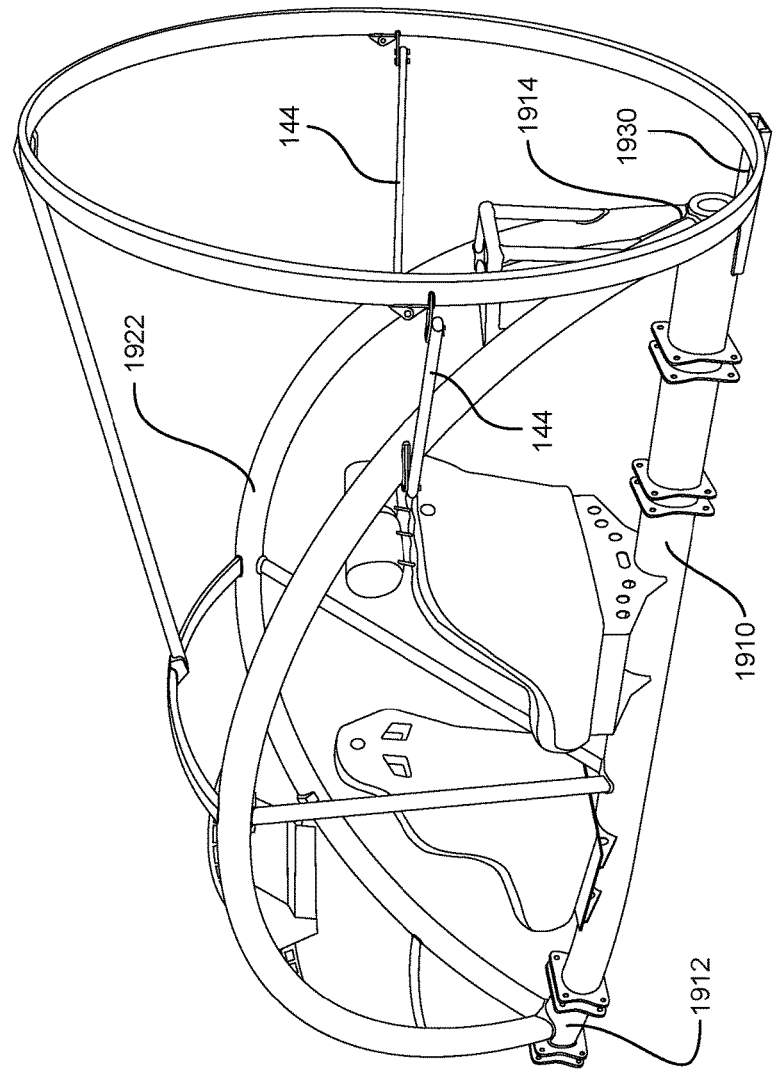
FIG. 19 depicts a rear-left view including details of a frame, supplemental supports, engine mount, and propeller shroud of an exemplary vehicle according to aspects of the invention.

FIG. 19 also provides a full view of how a fuel tank may be provided including a main tank; and at least two auxiliary tanks, wherein, the at least two auxiliary tanks extend upward and outward from the main tank, and the at least two auxiliary tanks may be substantially arc-shaped, and may be attached to the main tank at each end of the arc-shape.

Figure 20:
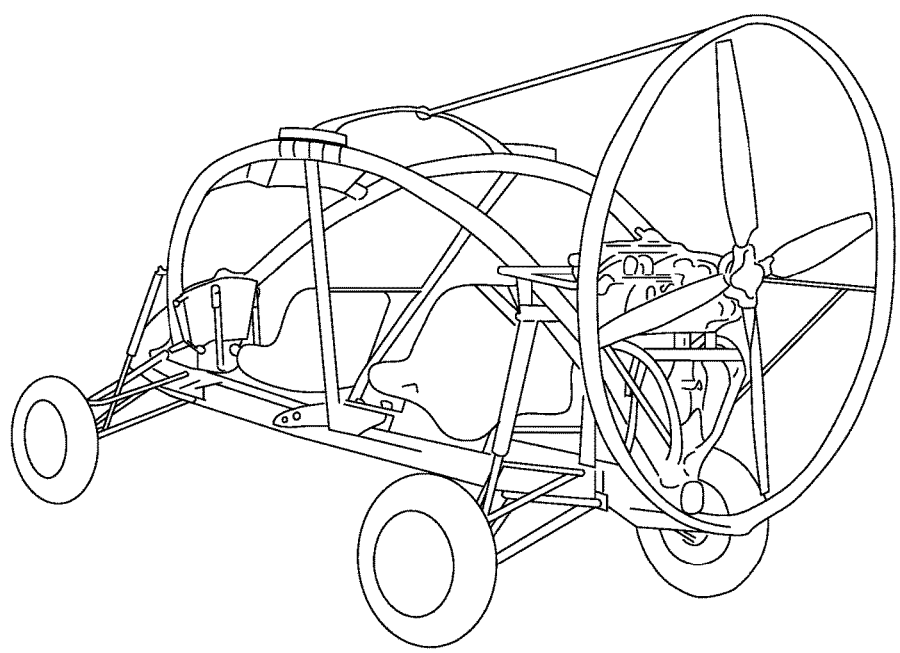
FIG. 20 depicts a rear-left view including details of an exemplary vehicle with an engine and propeller according to aspects of the invention.

FIG. 20 shows additional details regarding a more fully assembled vehicle include in the frame/tank of FIGS. 15-19, including the front and rear wheelbases, the engine and propeller.

Figure 21:
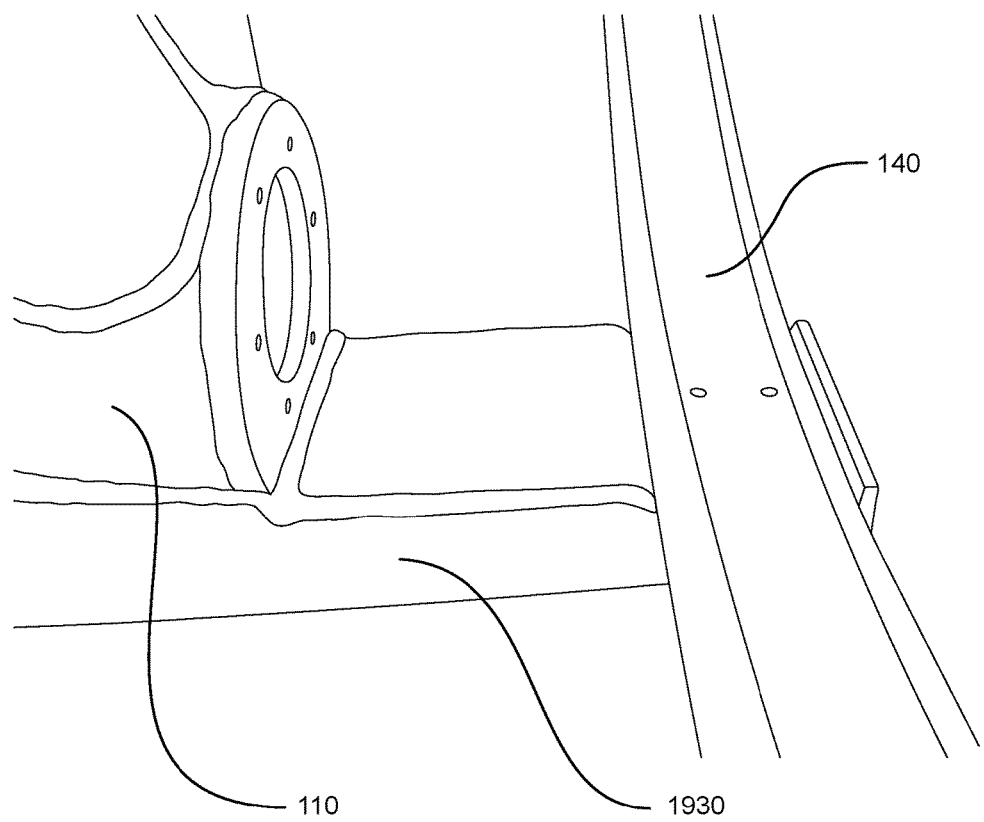
FIG. 21 depicts details of a frame portion and propeller shroud according to aspects of the invention.

FIG. 21 shows a close-up view of the propeller hoop ring 140 may be fixedly attached at the base to the main tank 110 (or an extension 1930 of the main tank).

In embodiments, the main tank may include a depression at the rear, and a fuel outlet in the depression. This may take the form, for example, of a scavenger tank attached to the bottom of the main tank, with access holes drilled in the bottom of the main tank. A fuel lead to the engine may be fed through the access holes and into the bottom of the scavenger tank. Alternatively, the main tank may be formed with a depression, or slope, toward the rear of the main tank, to allow scavenging of the maximum amount of fuel.

Figure 22:
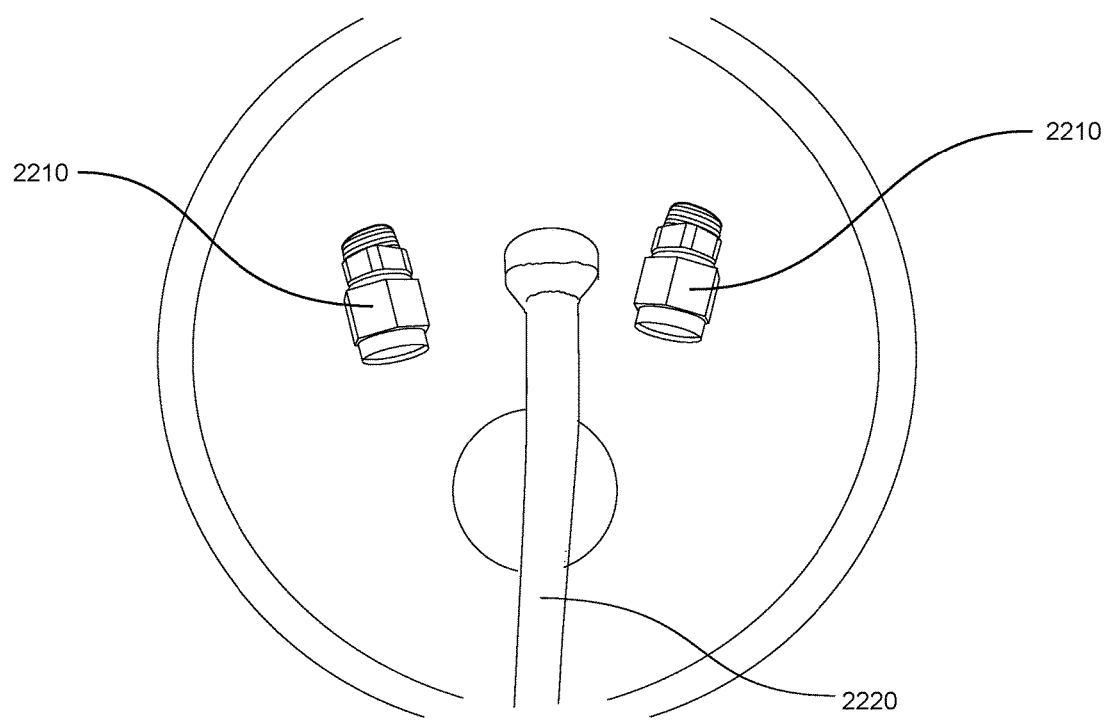
FIG. 22 depicts details inside an exemplary combination frame/fuel tank according to aspects of the invention.

In embodiments, each of the at least two auxiliary tanks may include a check valve, e.g. at, or about, each end. An example of two check valves 2210 through which fuel can flow from the two auxiliary tanks to the main tank is shown in FIG. 22. FIG. 22 is an internal view of the main tank 110, and also shows the fuel lead 2220 extending from the scavenger portion of the main tank, up and out of the main tank (which would lead to the engine). Each check valve 2210 may be configured to allow fuel to flow from the auxiliary tanks 120, 122 to the main tank 110 and impede fuel from flowing from the main tank 110 to the auxiliary tanks 120, 122. Configuring the auxiliary tanks with these check valves may be beneficial, for example, in maintaining substantially equal amounts of fuel in each of the auxiliary tanks, thereby improving the sustained flight characteristics of the vehicle, and/or to prevent sloshing of the fuel into the auxiliary tanks during maneuvering, which could destabilize the vehicle.

In embodiments, the fuel tank may include open cell foam, or similar material, in the tanks. Such materials may be beneficial, for example, in reducing leak rates in the event of punctures to the tank, to baffle the fuel e.g. to reduce sloshing, and/or act as a fire retardant.

While various embodiments have been described above, it is to be understood that the examples and embodiments described above are for illustrative purposes only and that various modifications or changes in light thereof will be suggested to persons skilled in the art, and are to be included within the spirit and purview of this application and scope of the appended claims. Therefore, the above description should not be understood as limiting the scope of the invention as defined by the claims.

What is claimed is:

1. A vehicle frame, incorporated in a vehicle, said frame comprising:
   a fuel tank including a main tank disposed substantially along a centerline of the vehicle; and a pair of tubular supports, each of the tubular supports being substantially arc-shaped and extending upward and outward from the centerline of the vehicle and converging to the centerline of the vehicle at each end of the arc-shape, wherein each of the tubular supports includes an attachment mechanism at a top of the arc-shape, the attachment mechanisms configured to attach to an airfoil suspension, and wherein the pair of tubular supports form a "V" shape viewed from a front of the vehicle, with a bottom of the "V" shape on the centerline of the vehicle and a top of the "V" shape corresponding to the top of the arc-shape.

2. The vehicle frame of claim 1, wherein the main tank is substantially tube-shaped.

3. The vehicle frame of claim 1, wherein each of the tubular supports is configured as an auxiliary fuel tank.

4. The vehicle frame of claim 1, further comprising elongated structural members that connect the tubular supports to the centerline of the vehicle, wherein each of the tubular supports is connected to one of the structural members at, or about, the attachment mechanism such that a lift force from the airfoil suspension is distributed to the centerline of the vehicle during flight.

5. The vehicle frame of claim 1, wherein the main tank is connected to at least one of a front wheel suspension and a rear wheel suspension, at least the main tank is configured as a loadbearing frame for the at least one of the front and rear wheel suspensions, and at least the tubular supports are configured as a load-bearing frame for the airfoil suspension.

6. The vehicle frame of claim 1, further compromising a cockpit disposed over the main tank and between the tubular supports, and an overhead control panel disposed at least partially above the cockpit and between the tubular supports, wherein the overhead control panel includes one or more of electrical hard point controls, circuit breakers, engine monitors, atmospheric indicators, performance indicators, and one or more structural supports connecting the tubular supports.

7. The vehicle frame of claim 1, wherein the frame is incorporated in the vehicle that is configured to be suspended by the attachment mechanism attached to the tubular supports.

8. The vehicle frame of claim 1, wherein the frame is integrated in the vehicle and the main tank and the tubular supports extend along at least 75% of the length of the vehicle.

9. The vehicle frame of claim 1, further comprising a cockpit disposed substantially above the main tank and between the tubular supports and including a seat for a human pilot; and a cargo area disposed rearward of the cockpit.

10. The vehicle frame of claim 9, wherein the cargo area includes a passenger seat for a human passenger.

11. The vehicle frame of claim 1, further comprising an overhead control panel mounted to and between the tubular supports, the overhead control panel including at least one of an electrical hard point control, a circuit breaker, an engine monitor, an atmospheric indicator, or a performance indicator.

12. A fuel tank for a vehicle, the fuel tank comprising:
a main tank; and
at least two auxiliary tanks, wherein, the at least two auxiliary tanks extend upward and outward from the main tank, and the at least two auxiliary tanks are substantially arc-shaped, and are attached to the main tank at each end of the arc-shape, wherein the at least two auxiliary tanks form a "V" shape and are joined to the main tank at the base of the "V" when viewed from a front of the fuel tank and the top of the "V" shape corresponds to a top of the arc-shape, and wherein the at least two auxiliary tanks are each directly attached to a respective front shock absorber for a front wheel suspension of the vehicle, and a respective rear shock absorber for a rear wheel suspension of the vehicle.

13. The fuel tank of claim 12, wherein each of the at least two auxiliary tanks includes a check valve at, or about, each end, each of the check valves configured to allow fuel to flow from the auxiliary tanks to the main tank and impede fuel from flowing from the main tank to the auxiliary tanks.

14. The fuel tank of claim 12, wherein each of the at least two auxiliary tanks includes a check valve that allows fuel to flow from the auxiliary tanks to the main tank and impedes fuel from flowing from the main tank to the auxiliary tanks.

15. The fuel tank of claim 12, wherein the main tank is directly connected to at least one of the front wheel suspension and the rear wheel suspension.

16. The fuel tank of claim 15 wherein the vehicle has flight capability, at least the main tank is configured as a load-bearing frame for the front and rear wheel suspensions, and at least the auxiliary tanks are configured as a load-bearing frame for an airfoil suspension.

17. The fuel tank of claim 12, wherein, the at least two auxiliary tanks extend upward and outward from the main tank at an angle between 30° and 80° to horizontal.

18. The fuel tank of claim 12, wherein the fuel tank is incorporated in the vehicle that is configured to be suspended by a connection mechanism attached directly to the auxiliary tanks.

19. The fuel tank of claim 12, wherein the fuel tank includes open cell foam.

* * * * *